(12) United States Patent
Uhler

(10) Patent No.: US 7,181,600 B1
(45) Date of Patent: Feb. 20, 2007

(54) READ-ONLY ACCESS TO CP0 REGISTERS

(75) Inventor: G. Michael Uhler, Menlo Park, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 712 days.

(21) Appl. No.: 09/921,377

(22) Filed: Aug. 2, 2001

(51) Int. Cl.
*G06F 9/48* (2006.01)

(52) U.S. Cl. ............................................... 712/229
(58) Field of Classification Search ................. 712/229
See application file for complete search history.

(56) References Cited

U.S. PATENT DOCUMENTS

| | | | | |
|---|---|---|---|---|
| 3,828,327 | A | * 8/1974 | Berglund et al. | 710/264 |
| 4,949,238 | A | * 8/1990 | Kamiya | 711/164 |
| 5,109,489 | A | * 4/1992 | Umeno et al. | 710/36 |
| 5,148,544 | A | * 9/1992 | Cutler et al. | 710/261 |
| 5,572,704 | A | 11/1996 | Bratt et al. | |
| 5,621,886 | A | * 4/1997 | Alpert et al. | 714/38 |
| 5,623,636 | A | * 4/1997 | Revilla et al. | 711/163 |
| 5,632,025 | A | 5/1997 | Bratt et al. | |
| 5,701,493 | A | * 12/1997 | Jaggar | 710/261 |
| 5,701,501 | A | 12/1997 | Gandhi | |
| 5,740,451 | A | 4/1998 | Muraki et al. | |
| 5,742,780 | A | * 4/1998 | Caulk, Jr. | 712/206 |
| 5,768,599 | A | 6/1998 | Yokomizo | |
| 5,805,918 | A | 9/1998 | Blomgren et al. | |
| 5,887,175 | A | 3/1999 | Col et al. | |
| 5,911,065 | A | 6/1999 | Williams et al. | |
| 6,061,709 | A | 5/2000 | Bronte | |
| 6,249,881 | B1 | 6/2001 | Porten et al. | |
| 6,282,657 | B1 | * 8/2001 | Kaplan et al. | 713/201 |
| 6,341,324 | B1 | * 1/2002 | Caulk et al. | 710/260 |
| 6,393,556 | B1 | * 5/2002 | Arora | 712/229 |
| 6,397,379 | B1 | * 5/2002 | Yates et al. | 717/140 |
| 6,496,912 | B1 | * 12/2002 | Fields et al. | 711/170 |
| 6,560,698 | B1 | 5/2003 | Mann | |
| 6,732,298 | B1 | 5/2004 | Murthy et al. | |
| 6,763,450 | B1 | 7/2004 | Miyaguchi et al. | |
| 6,772,326 | B2 | 8/2004 | Chauvel et al. | |
| 6,779,065 | B2 | 8/2004 | Murty et al. | |
| 6,820,153 | B2 | 11/2004 | Yanagi et al. | |
| 6,842,811 | B2 | 1/2005 | Barry et al. | |

OTHER PUBLICATIONS

Intel, *IAPX88 Book with an Introduction to the IAPX88*, 1983, Intel, pp. 2–1 to 2–17, 2–64, 2–154, 47, 48 to 49, 62, 63.
Alpha Architecture Handbook (Oct. 1996). Digital Equipment Corporation, Maynard, Massachusetts.
U.S. Appl. No. 09/592,106, filed Jun. 12, 2000, Melvin et al.
David L. Weaver et al. "*The SPARC Architecture Manual,*" Version 9. SPARC International, Inc. 1994.

(Continued)

*Primary Examiner*—Eric Coleman
(74) *Attorney, Agent, or Firm*—James W. Huffman

(57) ABSTRACT

A bit mask register is provided within the privileged architecture of a microprocessor. The bit mask register includes a plurality of bits, the bits corresponding to other privileged architecture registers. When a bit in the bit mask register is set, its corresponding privileged architecture register is made read-only accessible when the microprocessor is in user mode. When a bit in the bit mask register is clear, its corresponding privileged architecture register is unavailable when the microprocessor is in user mode. If an instruction executing in user mode requests access to a privileged architecture register, and its corresponding bit in the bit mask register is clear, an exception is generated, allowing a kernel mode operating system to optionally set the corresponding bit in the bit mask register, and provide read-only access to the register.

21 Claims, 5 Drawing Sheets

OTHER PUBLICATIONS

*RISC Microprocessor Databook, 32–Bit TX System RISC TX39 Family TX39/H2 Processor Core,* Chapters 1–8, Appendix A, Doc. ID 4412D–9908 (1998).

Toshiba Data sheet List;http://www.seicon.toshiba.co/jp/eng/prd/micro/td/td_all.html; Toshiba Semiconductor Company.

Alpha Architecture Handbook (Oct. 1996). pp. 11–2 and C–20.

CompactRISC CR16A Programmer's Reference Manual (Feb. 1997); pp. 2–6, 3–3, 5–12, and 5–13.

* cited by examiner

Flow Chart for update of Read-only Mask Register

| Mnemonic | Function |
|---|---|
| RDC0 | Move from Coprocessor Zero (Read-only) |
| DRDC0 | Doubleword Move from CP0 (Read-only) |
| MTC0 | Move to CP0 bit mask (Kernel Mode only) |

READ-ONLY ACCESS TO CP0 REGISTERS

CROSS REFERENCE TO RELATED APPLICATION(S)

This application is related to U.S. patent application Ser. No. 09/921400 entitled "ATOMIC UPDATE OF CP0 STATE" assigned to MIPS Technologies, Inc.

FIELD OF THE INVENTION

This invention relates in general to the field of computer architecture, and more specifically to a method and apparatus for providing read-only access to specified privileged level registers by instructions executing in user mode.

BACKGROUND OF THE INVENTION

Modern microprocessors are typically designed so that they may be easily adapted for use in alternative operating environments, and configured for a variety of applications. That is, a given microprocessor might be used in environments as diverse as: 1) within a cell phone; 2) within a video gaming system; and 3) within a computer system. In the cell phone environment, the microprocessor will typically execute only those instructions that are developed by the manufacturer of the cell phone, and stored within a read-only memory in the phone. Within a video gaming system, the microprocessor must execute an "embedded" set of instructions that are developed by the manufacturer of the gaming system, and instructions developed by manufacturers of video games. Within a computer system, the microprocessor must execute instructions developed by the manufacturer of the computer system, instructions developed by an operating system manufacturer, instructions developed by an applications manufacturer, as well as instructions that are developed by the end user.

To allow microprocessors to operate within such diverse environments, and to insure that once they are configured for a particular environment, they are not changed, microprocessors are typically designed to operate in several different security modes or levels. Each of the security modes or levels of a microprocessor define what resources within its operating environment an instruction has access to, what features of the microprocessor are enabled, how the microprocessor is to view external memory, etc.

Simplistically, modern microprocessors have at least two operating modes referred to as "kernel" mode, and "user" mode. When a microprocessor is powered on, it begins operating in kernel mode. This means that the first set of instructions that execute have access to all of the resources of the microprocessor, and can define how the microprocessor is to operate, how it should be configured for its present environment, etc. Once the kernel mode instruction set configures the processor, it may switch the microprocessor to operate in user mode. At this point, instructions have access to general-purpose registers, but not to privileged architecture registers that control the operation, or configuration of the microprocessor. Such a dual mode architecture provides security for the computing system, insures reliability of the operating environment, and prevents user mode instructions from accessing or modifying privileged resources.

Within the privileged architecture of a microprocessor are configuration registers, that establish how the microprocessor is to view memory, whether it is operating in 32 or 64-bit mode, whether it is operating in kernel mode, or user mode, etc. In addition, other resources are provided that assist a developer in designing their product with the microprocessor, including debug registers, count registers, performance counters, etc. Often, these developers are operating within the kernel mode of the microprocessor, and thus have access to these resources. However, it has become desirable, within some environments, to provide access to certain privileged resources, while the microprocessor is in user mode. Unfortunately, in contemporary microprocessors, access to privileged resources has been an all or nothing proposition. That is, while in kernel mode, a bit is set in a configuration register that allows user mode instructions to access the privileged architecture. Unfortunately, once the bit is set, the user mode instructions are provided with full read/write access to all of the privileged resources. This situation defeats all of the security benefits provided by a dual mode microprocessor.

Therefore, what is needed is a mechanism that allows an operating system (operating in kernel mode) to selectively configure particular privileged resources for access by user mode instructions, while still preventing access to other privileged resources.

Furthermore, what is needed is a method and apparatus that maintains the security of an operating environment, while providing the benefit of access by user mode instructions to certain privileged resources, on a case-by-case basis.

And, what is needed is a microprocessor that allows kernel mode instructions to define how user mode instructions access privileged resources.

Furthermore, what is needed is a configurable mechanism within a microprocessor to allow an operating system to virtualize access to privileged resources, from the viewpoint of user mode instructions.

SUMMARY

The present invention provides a method and apparatus for providing configurable user mode access to specified privileged architecture registers, while preventing access to other privileged resources.

In one aspect, the present invention provides a microprocessor that includes general purpose registers that are accessible by instructions executing in a non-privileged state; privileged state registers that are accessible by instructions executing in a privileged state; and a mask register that is writable only when the microprocessor is in the privileged state. The mask register specifies ones of the privileged state registers to be accessible by instructions executing in a non-privileged state.

In another aspect, the present invention provides a method for providing user mode access to specified privileged state registers within a microprocessor. The method includes: providing a mask register, writable while in a kernel mode of the microprocessor, the mask register containing bits that correspond to privileged state registers; setting specified ones of the bits, while in the kernel mode of the microprocessor; and if a user mode instruction requests access to one of the privileged state registers, and if a corresponding one of the bits within the mask register has been set, providing the contents of the one of the privileged state registers to the user mode instruction.

In yet a further aspect, the present invention provides a privileged register set within a microprocessor that includes: privileged registers that are accessible by instructions executing while the microprocessor is in a kernel mode; and a mask register for containing a bit pattern, the bit pattern specifying ones of the privileged registers to be read-only accessible by instructions executing while the microprocessor is in a user mode.

In another aspect, the present invention provides a computer program product for use with a computing device. The computer program product includes: a computer usable medium, having computer readable program code embodied in the medium, for causing a microprocessor to be described. The computer readable program code includes: first program code to provide general purpose registers that are accessible by instructions executing in a non-privileged state; and second program code to provide privileged state registers that are accessible by instructions executing in a privileged state; and third program code to provide a mask register that is writable only when the microprocessor is in the privileged state, the mask register specifying ones of the privileged state registers to be accessible by instructions executing in a non-privileged state.

In a further aspect, the present invention provides a computer data signal embodied in a transmission medium. The data signal includes computer-readable program code to provide a privileged register set within a microprocessor. The program code includes: first program code to provide privileged registers that are accessible by instructions executing while the microprocessor is in a kernel mode; and second program code to provide a mask register for containing a bit pattern, the bit pattern specifying ones of the privileged registers to be read-only accessible by instructions executing while the microprocessor is in a user mode.

In yet another aspect, the present invention provides a method to allow an operating system to control user mode access to privileged architecture registers within a microprocessor. The method includes: providing a mask register within the microprocessor, the mask register having bits that correspond to the privileged architecture registers; within the operating system, setting particular bits within the mask register, the particular bits corresponding to ones of the privileged architecture registers that are to be made accessible to a request instruction executing when the microprocessor is in user mode; upon execution of the request instruction that requests access to one of the privileged architecture registers, determining whether a bit within the mask register, corresponding to the requested one of the privileged architecture registers, has been set; and if the bit has been set, providing access to the requested one of the privileged architecture registers.

Other features and advantages of the present invention will become apparent upon study of the remaining portions of the specification and drawings.

DETAILED DESCRIPTION

Figure 1:
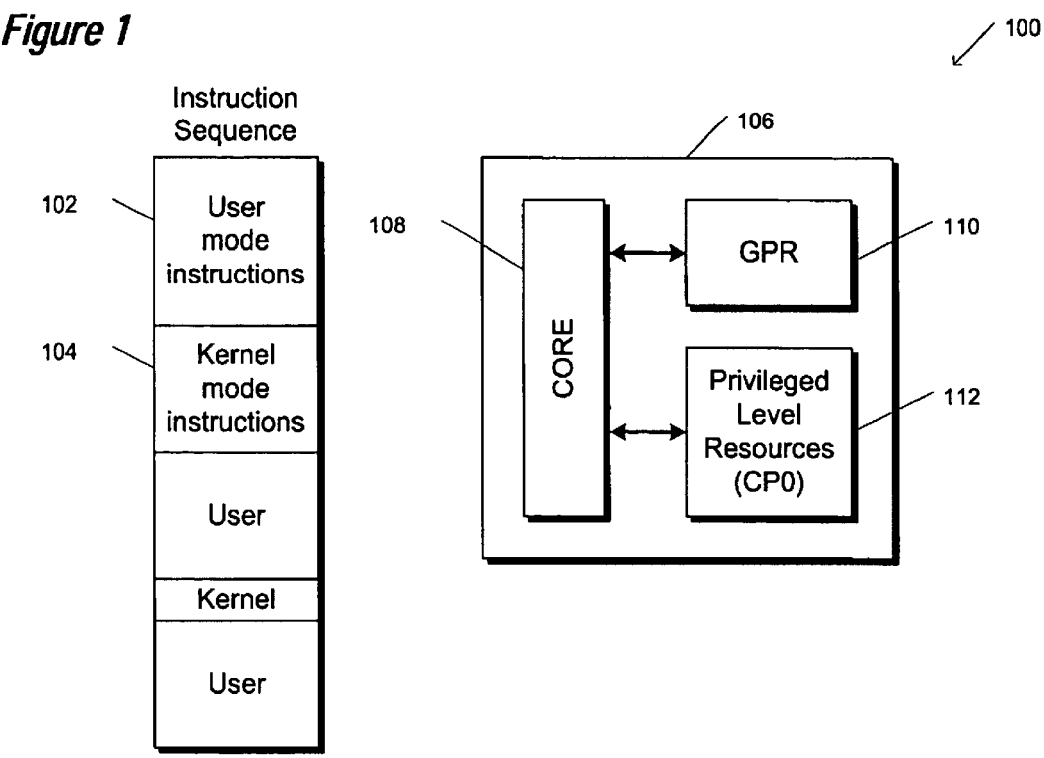
FIG. 1 is a block diagram of a microprocessor having general purpose registers accessible while instructions execute in user mode, and privileged registers accessible while instructions execute in kernel mode.

Referring to FIG. 1, a block diagram 100 shown illustrating a microprocessor (or CPU) 106 for executing user mode instructions 102 and kernel mode instructions 104. Both the user mode instructions 102 and the kernel mode instructions 104 are provided to a processing core 108 for execution by the microprocessor 106. The user mode instructions have access to a general purpose register file (GPR) 110 for storing, retrieving, and modifying data. The kernel mode instructions also have access to the GPR 110, but in addition, have access to privileged level resources 112.

In one embodiment, the privilege level resources 112 of the microprocessor 106 includes a control unit to handle interrupts, configuration options e.g., such as the endianness of data, and observing or controlling on-chip functions like caches and timers. The control unit within the CPU 106 for performing such tasks is called Coprocessor 0, or CP0 112. Note: Coprocessor 0 is a particular designation given to privileged architecture resources in MIPS processors developed by MIPS® Technologies, Inc., of Mountain View, Calif.

CP0 112 is coupled to control registers (not shown) that contain values that set how the CPU 106 is to operate, how it is to handle exceptions, how it is to manage memory, etc. For a listing of the control registers within the MIPS architecture, reference is made to Table 1 below. A complete description of each of these registers may be found in the MIPS32™ and MIPS64™ architecture Specifications, which are available from MIPS Technologies, Inc., and which are incorporated herein by reference for all purposes.

The interface to CP0 is through various instructions encoded with a COP0 opcode, including the ability to move data to and from the control registers. The control registers and the interaction with them make up is called the Privileged Resource Architecture.

TABLE 1

| Register Number | Sel | Register Name | Function | Compliance Level |
|---|---|---|---|---|
| 0 | 0 | Index | Index into the TLB array | Required |
| 1 | 0 | Random | Randomly generated index into the TLB array | Required |
| 2 | 0 | EntryLo0 | Low-order portion of the TLB entry for even-numbered virtual pages | Required |
| 3 | 0 | EntryLo1 | Low-order portion of the TLB entry for odd-numbered virtual pages | Required |
| 4 | 0 | Context | Pointer to page table entry in memory | Required |

TABLE 1-continued

| Register Number | Sel | Register Name | Function | Compliance Level |
|---|---|---|---|---|
| 5 | 0 | PageMask | Control for variable page size in TLB entries | Required |
| 6 | 0 | Wired | Controls the number of fixed ("wired") TLB entries | Required |
| 7 | All | | Reserved for future extensions | Reserved |
| 8 | 0 | BadVAddr | Reports the address for the most recent address-related exception | Required |
| 9 | 0 | Count | Processor cycle count | Required |
| 10 | 0 | EntryHi | High-order portion of the TLB entry | Required |
| 11 | 0 | Compare | Timer interrupt control | Required |
| 12 | 0 | Status | Processor status and control | Required |
| 13 | 0 | Cause | Cause of last general exception | Required |
| 14 | 0 | EPC | Program counter at last exception | Required |
| 15 | 0 | PRId | Processor identification and revision | Required |
| 16 | 0 | Config | Configuration register | Required |
| 16 | 1 | Config1 | Configuration register 1 | Required |
| 17 | 0 | LLAddr | Load linked address | Optional |
| 18 | 0–n | WatchLo | Watchpoint address | Optional |
| 19 | 0–n | WatchHi | Watchpoint control | Optional |
| 20 | 0 | | XContext in 64-bit implementations | Reserved |
| 21 | All | | Reserved for future extensions | Reserved |
| 22 | All | | Available for implementation dependent use | Implementation Dependent |
| 23 | 0 | Debug | EJTAG Debug register | Optional |
| 24 | 0 | DEPC | Program counter at last EJTAG debug exception | Optional |
| 25 | 0–n | PerfCnt | Performance counter interface | Recommended |
| 26 | 0 | ErrCtl | Parity/ECC error control and status | Optional |
| 27 | 0–3 | CacheErr | Cache parity error control and status | Optional |
| 28 | 0 | TagLo | Low-order portion of cache tag interface | Required |
| 28 | 1 | DataLo | Low-order portion of cache data interface | Optional |
| 29 | 0 | TagHi | High-order portion of cache tag interface | Required |
| 29 | 1 | DataHi | High-order portion of cache data interface | Optional |
| 30 | 0 | ErrorEPC | Program counter at last error | Required |
| 31 | 0 | DESAVE | EJTAG debug exception save register | Optional |

Figure 2:
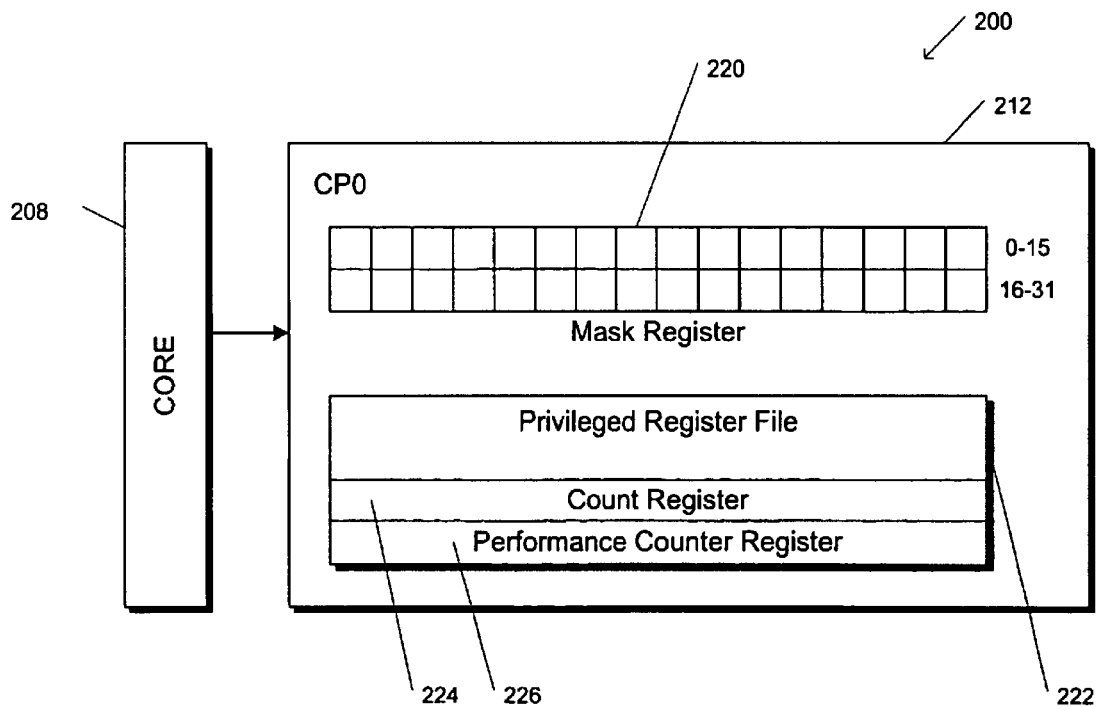
FIG. 2 is a block diagram illustrating privileged architecture registers within a microprocessor according to the present invention.

Referring now to FIG. 2, a block diagram 200 is that illustrates particular ones of the registers within a privileged register file 222 that are listed above in Table 1. More specifically, the CP0 212 includes a count register 224 (register 9 in Table 1), and a performance counter register 226 (register 25 in Table 1). It is the registers 224, 226, in addition to others not described, that provide benefits to user mode instructions, and that the present invention allows access to, without necessarily providing access to other ones of the privileged level resources 112 within CP0 212. In addition, the CP0 212 includes a Mask Register 220. The discussion below will describe the operation of the count register 224, and the performance counter register 226. Following this, a detailed description of the use and operation of the mask register 220 will be provided with particular reference to FIGS. 3–6.

The Count register 224 acts as a timer, incrementing at a constant rate, whether or not an instruction is executed, retired, or any forward progress is made through the pipeline of the microprocessor 106. The rate at which the counter increments is implementation dependent, and is a function of the frequency of the processor, not the issue width of the processor. A preferred implementation is to increment the count register 224 once per processor cycle. The format of the count register 224 is provided in Table 2 below.

TABLE 2

| Fields | | | Read/ Reset | |
|---|---|---|---|---|
| Name | Bits | Description | Write State | Compliance |
| Count | 31:0 | Interval counter | R/W Undefined | Required |

*Information about the MIPS architecture is available from MIPS Technologies, Inc of Mountain View, California.

Within the MIPS architecture, the performance counter register 226 supports implementation dependent performance counters that provide the capability to count events or cycles for use in performance analysis. If performance counters are implemented, each performance counter consists of a pair of registers: a 32-bit control register and a 32-bit counter register. To provide additional capability, multiple performance counters may be implemented.

Performance counters can be configured to count implementation dependent events or cycles under a specified set of conditions that are determined by the control register for the performance counter. The counter register increments once for each enabled event. When bit 31 of the counter register is one (the counter overflows), the performance counter optionally requests an interrupt that is combined in an implementation dependent way with the hardware interrupt 5 in the Cause register (not shown). Counting continues after a counter register overflow whether or not an interrupt is requested or taken.

Each performance counter is mapped into even-odd values of the performance counter register 226. Even selects access to the control register and odd selects access to the counter register. Table 3 below shows an example of two performance counters and how they map into the select values of the performance counter register 226.

TABLE 3

| Fields | Performance Counter Register Select Value | Performance Counter Register Usage |
|---|---|---|
| 0 | Select 0 | Control Register 0 |
|   | Select 1 | Control Register 0 |
| 1 | Select 2 | Control Register 1 |
|   | Select 3 | Control Register 1 |

More or less than two performance counters are also possible, extending the select field to obtain the desired number of performance counters. Software may determine if at least one pair of performance counter control and counter registers is implemented via a PC bit in the config1 register. If the M bit is one in the performance counter control register referenced via a select field of 'n', another pair of performance counter control and counter registers is implemented at the select values of 'n2' and 'n3'.

The control register associated with each performance counter controls the behavior of the performance counter. Table 4 below describes the performance counter control register fields.

TABLE 4

| Fields | | | | Read/ | Reset | |
|---|---|---|---|---|---|---|
| Name | Bits | Description | | Write | State | Compliance |
| M | 31 | If this bit is a one, another pair of Performance Counter Control and Counter registers is implemented at a MTC0 or MFC0 select field value of 'n+2' and 'n+3'. | | R | Undefined | Required |
| 0 | 30:11 | Must be written as zero; returns zero on read | | 0 | 0 | Reserved |
| Event | 10:5 | Selects the event to be counted by the corresponding Counter Register. The list of events is implementation dependent, but typical events include cycles, instructions, memory reference instructions, branch instructions cache and TLB misses, etc. If an implementation does not support all possible encodings of this field, it is implementation dependent how the unimplemented encodings are interpreted. The preferred implementation is to treat them as null events that enable no counts. Implementations that support multiple performance counters allow ratios of events, e.g., cache miss ratios if cache miss and memory references are selected as the events in two counters | | R/W | Undefined | Required |
| IE | 4 | Interrupt Enable. Enables the interrupt request when the corresponding counter overflows (bit 31 if the counter is one). Note that this bit simply enables the interrupt request. The actual interrupt is still gated by the normal interrupt masks and enable in the Status register. 0: Performance counter interrupt disabled 1: Performance counter interrupt enabled. | | R/W | 0 | Required |
| U | 3 | Enables event counting in User Mode. 0: Disable event counting in User Mode 1: Enable event counting in User Mode. | | R/W | Undefined | Required |
| S | 2 | Enables event counting in Supervisor Mode (for those processors that implement Supervisor Mode. If the processor does not implement supervisor mode, this bit must be ignored on write and return zero on read. 0: Disable event counting in Supervisor Mode | | R/W | Undefined | Required |

TABLE 4-continued

| Fields | | | Read/ | Reset | |
|---|---|---|---|---|---|
| Name | Bits | Description | Write | State | Compliance |
| | | 1: Enable event counting in Supervisor Mode | | | |
| K | 1 | Enables event counting in Kernel Mode. This bit enables event counting only when the EXL and ERL bits in the Status register are zero. | R/W | Undefined | Required |
| EXL | 0 | Enables event counting when the EXL bit in the Status register is one and the ERL bit in the Status register is zero.<br>0: Disable event counting while EXL=1, ERL=0<br>1: Enable event counting while ELX=1, ERL=0 | R/W | Undefined | Required |

The counter register associated with each performance counter increments once for each enabled event. Table 5 below describes the performance counter register fields.

TABLE 5

| Fields | | | Read/ | Reset | |
|---|---|---|---|---|---|
| Name | Bits | Description | Write | State | Compliance |
| Event Count | 31:0 | Increments once for each event that is enabled by the corresponding control register. When bit 31 is one, an interrupt request is made if the IE bit in the control register is 1. | R/W | Undefined | Required |

Figure 3:
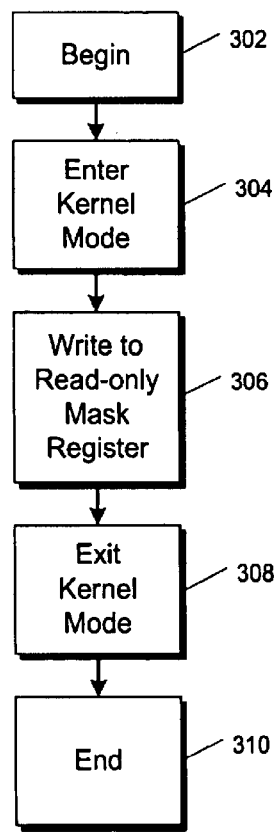
FIG. 3 is a flow chart illustrating how a bit mask register is set, within the privileged architecture of the present invention.

Referring now to FIG. 3, a flow chart 300 is provided that particularly illustrates how the mask register 220 of FIG. 2 is updated to enable access to particular ones of the privileged level resources 212, including the counter register 224 and the performance counter register 226, according to the present invention. Instruction flow begins at block 302 and proceeds to block 304.

At block 304 the microprocessor 212 enters kernel mode. One skilled in the art will appreciate that a microprocessor may enter kernel mode operation in a variety of ways, including when an exception is generated by the microprocessor, or when an interrupt occurs. Flow then proceeds to block 306.

At block 306 a write is made to the mask register 220. In one embodiment, the write is performed by an instruction MTC0 (shown in FIG. 6) which moves a value stored in one of the general purpose registers 110 into the mask register 220. Alternatively, the write is performed by an existing instruction MTC0 which moves a value stored in one of the general purpose registers 110 into a mask register 220 that is defined within the CP0. In one embodiment, the mask register 220 is a 32-bit register such that each bit in the mask register 220 has a one-to-one correspondence with one of the 32 privileged registers 222 indicated above in Table 1. If user mode access to the Status register, for example, were desired by the operating system, bit 12 within the mask register 220 would be set. If access to the both the count register 224 and the performance counter register 226 were desired, the operating system would set bits 9 and 25 of the mask register 220. Other bits within the mask register 220, pertaining to other registers within the privileged level resources 112, would be cleared so that user mode instructions would not have access to them. Of course, one skilled in the art will appreciate that a one-to-one correspondence between the bits in the mask register 220, and the privilege level resources 112 is not required. Any bit pattern that identifies one or more privileged level resources for user mode access, while excluding others, is within the scope of the present invention. After a write is performed to the mask register 220, flow proceeds to block 308.

At block 308, the processor exits kernel mode.

Figure 4:
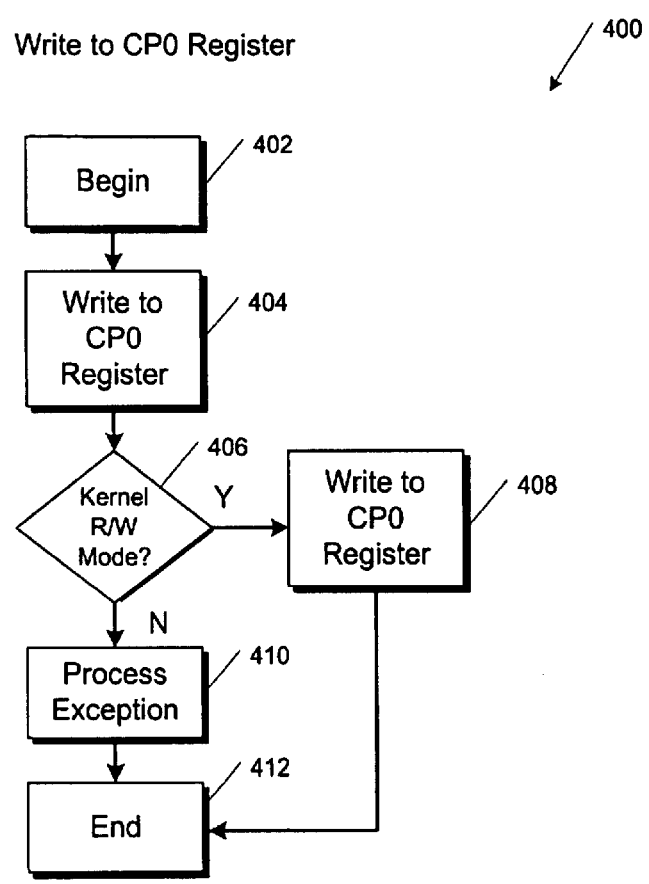
FIG. 4 is a flow chart illustrating writing to a privileged architecture register according to the present invention.

Referring now to FIG. 4, a block diagram 400 is shown to particularly illustrate the flow of a write operation to one of the privileged registers within CP0 212. Flow begins at block 402 and proceeds to block 404.

At block 404 an instruction attempts a write to a one of the privileged registers within CP0 212. Flow then proceeds to decision block 406.

At decision block 406 a determination is made as to whether the microprocessor is currently in kernel mode (and R/W access is not enabled) or if privileged software has enabled read/write access to all CP0 registers. That is, a decision is made as to whether a status bit (disposed, for example, in an architecturally-defined status register) has been set, which allows full access to CP0 from user mode (i.e., R/W access is enabled), as described above. (In a MIPS processor, the status bit referenced above is identified as "CU" and is disposed within the processor's status register. Additional information regarding this status bit and register may be found in MIPS 32™ ARCHITECTURE FOR PROGRAMMERS, VOLUME III: THE MIPS32™ PRIVILEGED RESOURCE ARCHITECTURE, Rev. 0.95 (2001), which is hereby incorporated by reference in its entirety for all purposes, and is available from MIPS Technologies, Inc. located in Mountain View, Calif.) If the processor is in kernel mode, flow proceeds to block 408 where the write is performed. However, if the processor is not in kernel mode, flow proceeds to block 410.

At block 410, an exception is generated by the microprocessor. The exception is generated because a user mode instruction attempted to write to a privileged level resource. Such a write violates the security of the microprocessor, and is therefore not allowed. An exception causes the processor to enter kernel mode, and execute a program that responds to this erroneous condition. Flow then proceeds to block 412 where the write to CP0 212 completes.

Figure 5:
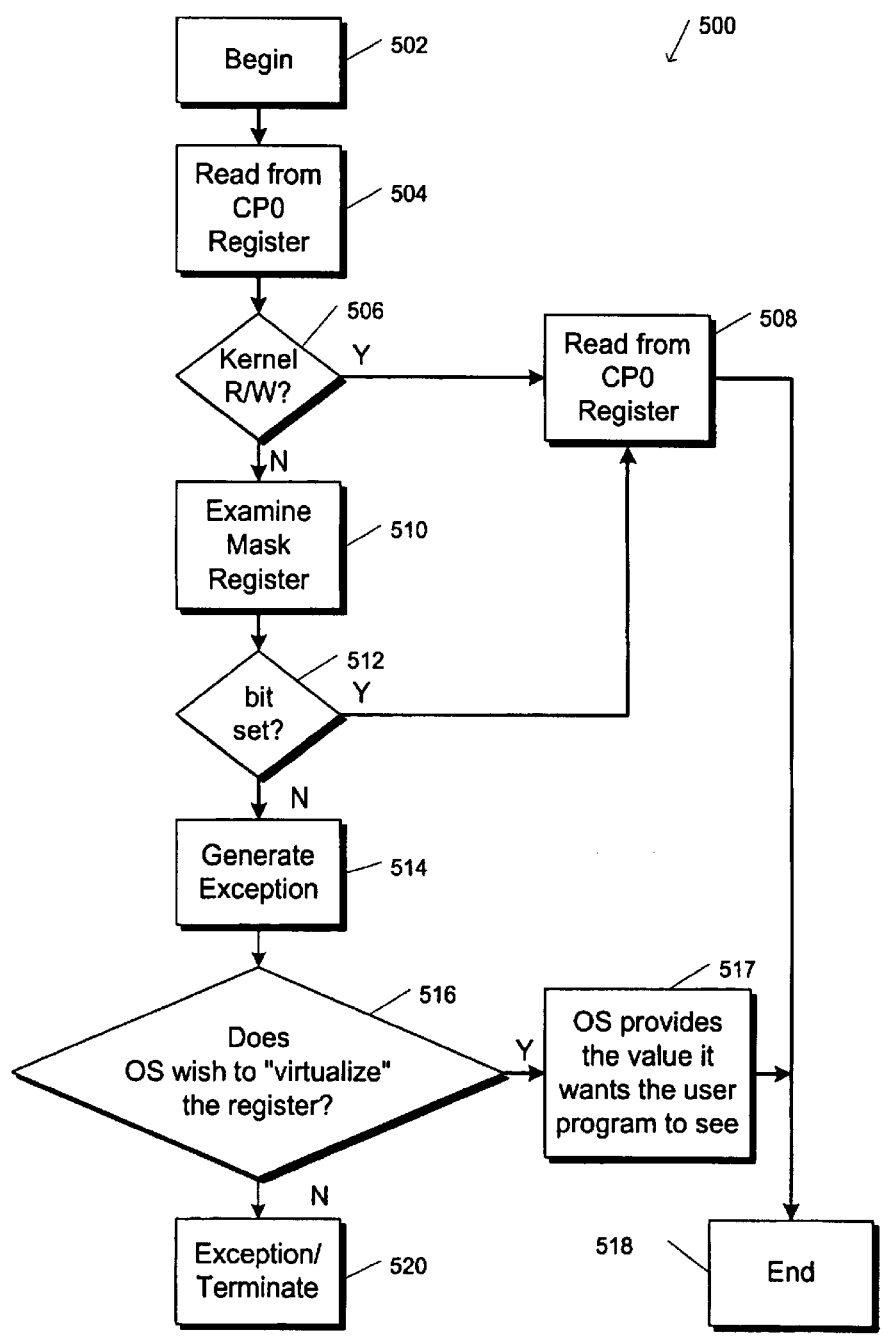
FIG. 5 is a flow chart illustrating reading a privileged architecture register, utilizing the bit mask register, according to the present invention.

Referring now to FIG. 5, a flow chart 500 is provided that particularly illustrates operation of a read from CP0 212, according to the present invention. The read operation begins at block 502 and proceeds to block 504.

At block 504 an instruction begins execution in the microprocessor, and requests a read. from one of the privileged level resources 112. Flow then proceeds to decision block 506.

At decision block 506, a determination is made as to whether the microprocessor is in kernel mode (or R/W access is enabled). If the microprocessor is in kernel mode (and R/W access is enabled), flow proceeds to block 508 where the contents of the privileged resource within CP0 212 are provided to the instruction. Flow then proceeds to block 518 where the read operation ends.

If the microprocessor is not in kernel mode (and R/W access is not enabled), i.e., the processor is in user mode, flow proceeds to block 510.

At block 510, the contents of the mask register 220 are examined. Flow then proceeds to decision block 512.

At decision block 512 a determination is made as to whether the bit in the mask register 220 that corresponds to the privileged level register that is attempting to be read by the instruction, is set or cleared. If the corresponding bit is set, flow proceeds to block 508 where the contents of the privileged level register are provided to the instruction. One skilled in the art will appreciate that this scenario has allowed a user mode instruction to access the contents of a privileged level resource, such as the count register 224, or the performance counter register 226, based on the contents of the mask register 220. Flow then proceeds to block 518 where the read operation ends.

If the corresponding bit in the mask register 220 is not set, flow proceeds to block 514 where an exception is generated, causing the microprocessor to enter kernel mode. Flow then proceeds to decision block 516.

At decision block 516, a determination is made by the operating system as to whether read-only access to the requested privileged level resource should be granted. That is, although the operating system has not yet established user mode access to the privileged level resource, it is possible that they operating system may now wish to grant such access. If it does, then the operating system will update the contents of the mask register 220 (according to the flow chart 300 described above), by setting the bit in the mask register 220 corresponding to the requested privileged level resource. For example, in some cases the operating system may want to let the user mode program read a privileged resource, such as a count register, or alternatively, it may want to "virtualize" the value of the privileged resource. That is, the operating system may want to present the user mode program with a value that appears to increment only when the user mode program is running, rather than all the time. In such an example, the operating system could create a software copy of the privileged resource (i.e., the count register), updating it from the CP0 register when the user mode program starts and stops. By clearing the enable bit for the privileged resource in the mask register 220, but setting it for some other register, the operating system can decide whether the user mode program has direct hardware access to the CP0 registers, or whether the operating system is going to "virtualize" the register. Flow then proceeds to block 517 where the contents of the privileged level resource are provided to the instruction. Alternatively, the microprocessor may exit kernel mode, and simply restart the instruction that requested access to the privileged level resource. Flow would be similar to that described in FIG. 5, but this time through, the bit, at decision block 512, would be set.

If the operating system does not wish to provide the instruction with access to the privileged level resource, the contents of the resource will not be provided to the instruction. In this case, flow proceeds to block 520 where a standard exception occurs, which usually kills the process. It is not restarted.

At this point it should be appreciated that access to privileged level resources has been enabled, on a resource-by-resource basis, through the use of the mask register 220. Furthermore, it should be appreciated that in instances where access to particular resources is requested, but not yet enabled, an operating system has the ability to virtualize access to requested resources, on a case-by-case basis, and grant or disallow access as desired.

Figure 6:
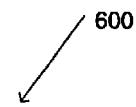
FIG. 6 is a table illustrating instructions that allow the read-only access to privileged architecture registers, according to the present invention.

Referring now to FIG. 6, a table 600 is shown illustrating three new instructions that are being added to the MIPS architecture. The first two instructions, RDC0 and DRDC0, allow a move, and a doubleword move from a designated CP0 212 register. By incorporating the method and apparatus of the present invention, these instruction can retrieve the contents of a designated privileged level resource, if the resources corresponding bit in the mask register 220 is set. The third instruction MTC0 moves the contents in a general purpose register into the mask register 220 that is defined by a designated CP0 register.

Although the present invention and its objects, features, and advantages have been described in detail, other embodiments are encompassed by the invention. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core (e.g., a microprocessor core) that is embodied in program code and may be transformed to hardware as part of the production of integrated circuits. Also, the invention may be embodied as a combination of hardware and software.

Also, although access to particular privileged level resources have been enabled through the "setting" of corresponding bits in the mask register, and disabled through the "clearing" of corresponding bits in the mask register, one skilled in the art will appreciate that this architecture may be reversed. In fact, any implementation that designates specific privileged level resources as enabled, or disabled, for purposes of access by user mode instructions, is within the mind of the inventor.

Furthermore, the embodiment described above illustrates read-only access to particular privileged level resources while in user mode. It is within the mind of the inventor, and the scope of the present invention, to also allow user mode write access to selected privileged level resources. This could be implemented with a similar mask register for writes, or alternatively, an indication of read-only, write-only, read/write, or none could be provided for by 2-bits for each corresponding privileged level resource.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A microprocessor comprising:
   a plurality of general purpose registers that are accessible by instructions executing in a non-privileged state;
   a plurality of privileged state registers that are accessible by instructions executing in a privileged state; and
   a mask register that is writable only when the microprocessor is in said privileged state, said mask register specifying ones of said plurality of privileged state registers to be accessible by instructions executing in a non-privileged state.

2. The microprocessor as recited in claim 1 wherein said non-privileged state comprises a user mode of the microprocessor.

3. The microprocessor as recited in claim 1 wherein said privileged state comprises a kernel mode of the microprocessor.

4. The microprocessor as recited in claim 1 wherein said plurality of privileged state registers comprises coprocessor zero (CP0) registers within a MIPS architecture microprocessor.

5. The microprocessor as recited in claim 1 wherein said plurality of privileged state registers comprise:
   a count register that increments at a constant rate; and
   a performance counter register for counting events or cycles under a specified set of conditions.

6. The microprocessor as recited in claim 5 wherein said specified set of conditions are specified by a control register for said performance counter register.

7. The microprocessor as recited in claim 1 wherein said mask register comprises:
   a plurality of mask bits, each of said plurality of mask bits corresponding to one of said plurality of privileged state registers.

8. The microprocessor as recited in claim 7 wherein when ones of said plurality of mask bits are set, said corresponding ones of said plurality of privileged state registers are made accessible to instructions executing in said non-privileged state.

9. The microprocessor as recited in claim 7 wherein when ones of said plurality of mask bits are not set, said corresponding ones of said plurality of privileged state registers are made inaccessible to instructions executing in said non-privileged state.

10. The microprocessor as recited in claim 1 wherein said ones of said privileged state registers that are accessible by instructions executing in a non-privileged state are read-only.

11. A method for providing user mode access to specified privileged state registers within a microprocessor, comprising:
   providing a mask register, writable while in a kernel mode of the microprocessor, the mask register containing a plurality of bits corresponding to a plurality of privileged state registers;
   setting specified ones of the plurality of bits, while in the kernel mode of the microprocessor; and
   providing the contents of one of the plurality of privileged state registers to a user mode instruction when the user mode instruction requests access to the one of the plurality of privileged state registers, and the bits corresponding to the one of the plurality of privileged state registers has been set by said step of setting; and
   denying access to the contents of the one of the plurality of privileged state registers to the user mode instruction when the user mode instruction requests accrss to the one of the plurality of privileged state registers, and the bits corresponding to the one of the privileged state registers has not been set by said step of setting.

12. The method as recited in claim 11 wherein said setting comprises:
   while in the kernel mode of the microprocessor, writing a value of "1" to the specified ones of the plurality of bits within the mask register for those ones of the plurality of privileged state registers that are to be made accessible.

13. The method as recited in claim 11 further comprising:
   if a user mode instruction requests access to one of the plurality of privileged state registers, and if a corresponding one of the plurality of bits within the mask register has not been set by said setting, generating an exception.

14. The method as recited in claim 13 wherein the exception comprises:
   in kernel mode, determining whether access to the one of the plurality of privileged state registers is desirable;
   if access is desirable, causing the corresponding one of the plurality of bits within the mask register to be set; and
   restarting execution of the user mode instruction.

15. A privileged register set within a microprocessor, comprising:
   a plurality of privileged registers that are accessible by instructions executing while the microprocessor is in a kernel mode; and
   a mask register for containing a bit pattern, said bit pattern specifying ones of said plurality of privileged registers to be read-only accessible by instructions executing while the microprocessor is in a user mode.

16. The privileged register set as recited in claim 15 wherein said mask register comprises a plurality of bits, each of said bits having a one to one correspondence to ones of said plurality of privileged registers.

17. The privileged register set as recited in claim 16 wherein for those of said plurality of bits that are set, their corresponding ones of said plurality of privileged registers are read-only accessible by instructions executing while the microprocessor is in said user mode.

18. The privileged register set as recited in claim 15 wherein said mask register is loaded with said bit pattern by an instruction executing while the microprocessor is in said kernel mode.

19. A method allowing an operating system to control user mode access to privileged architecture registers within a microprocessor, the method comprising:

providing a mask register within the microprocessor, the mask register having bits that correspond to the privileged architecture registers;

within the operating system, setting particular bits within the mask register, the particular bits corresponding to ones of the privileged architecture registers that are to be made accessible to a request instruction executing when the microprocessor is in user mode;

upon execution of the request instruction that requests access to one of the privileged architecture registers, determining whether a bit within the mask register, corresponding to the requested one of the privileged architecture registers, has been set;

if the bit has been set, providing access to the requested one of the privileged architecture registers; and if the bit has not been set, not providing access to the requested one of the privileged architecture registers.

20. The method as recited in claim 19 wherein when a privileged architecture register has been made accessible, the privileged architecture register is made read-only to the request instruction.

21. The method as recited in claim 19 wherein the mask register is written to when the microprocessor is operating in kernel mode.

* * * * *